Patented May 5, 1931

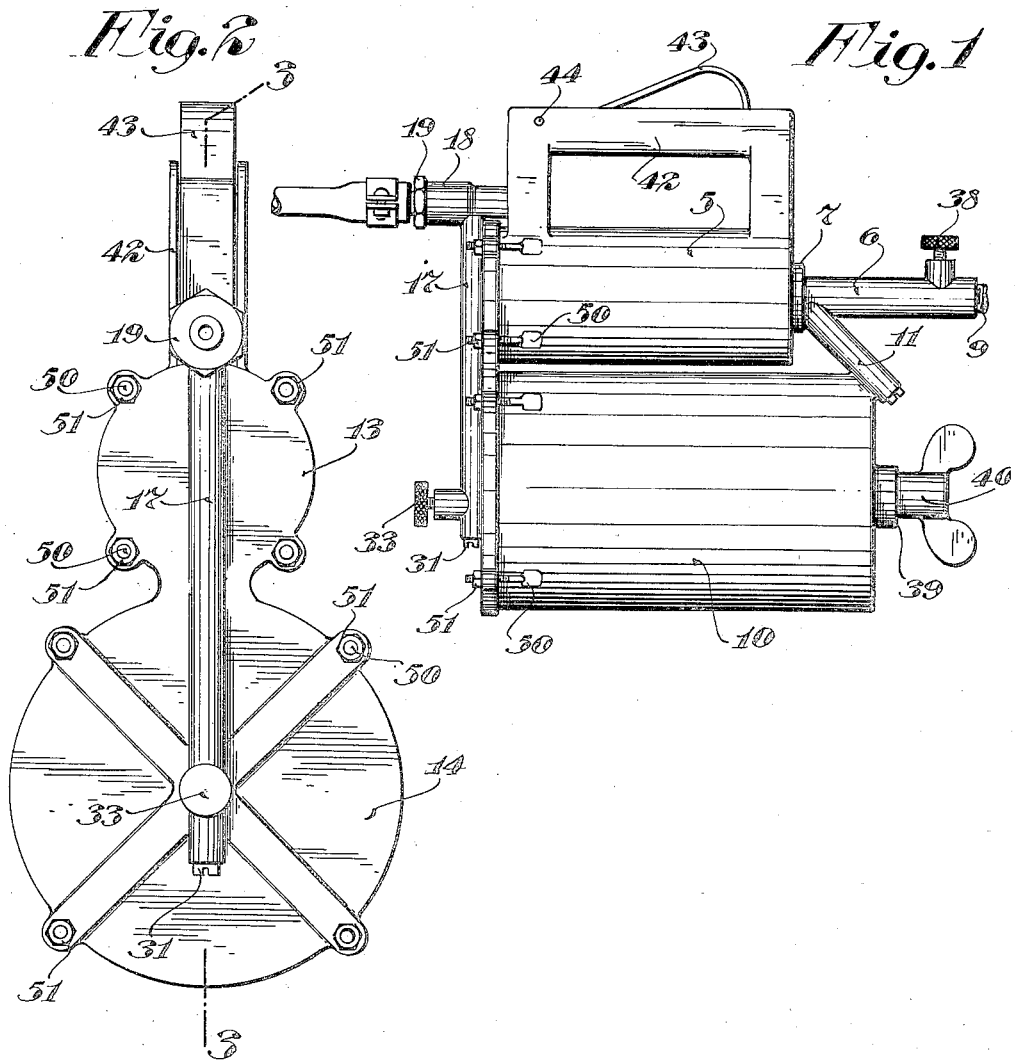

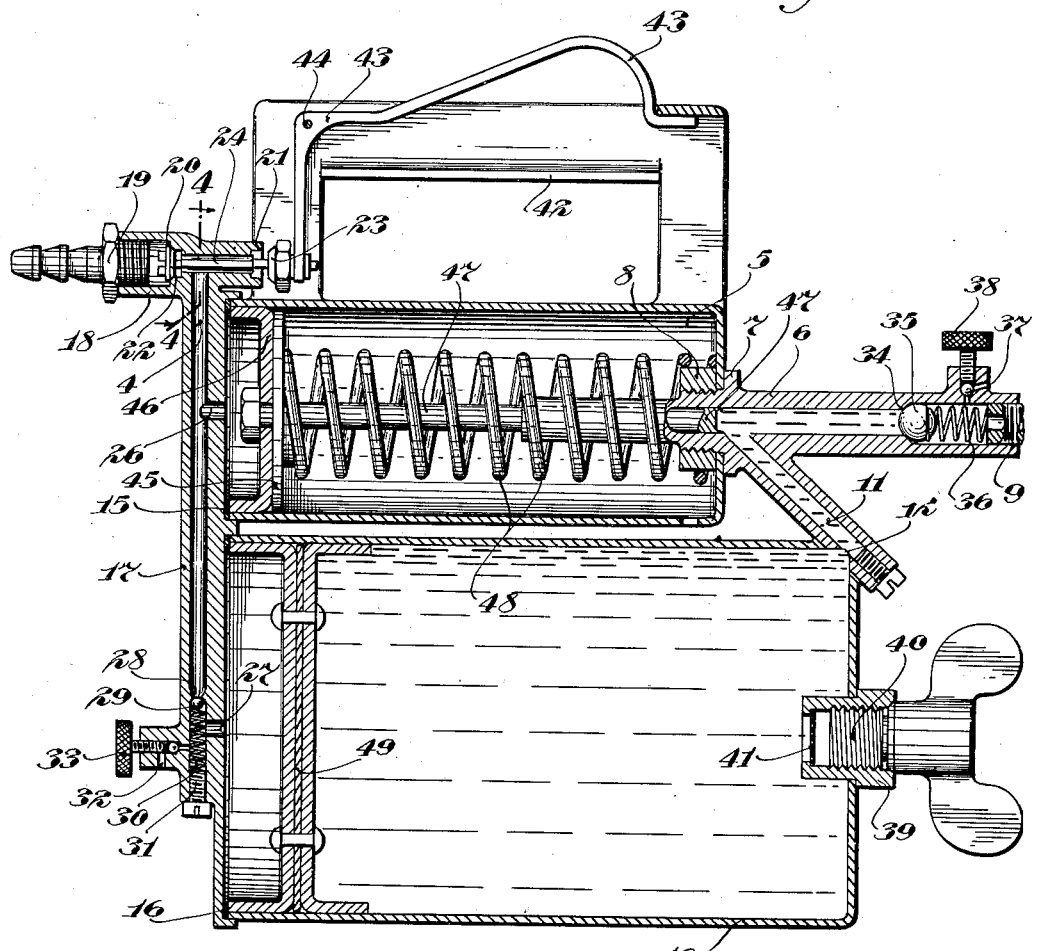

1,803,312

UNITED STATES PATENT OFFICE

VITUS A. BOKER, OF MINNEAPOLIS, MINNESOTA, ASSIGNOR TO MIN-A-MAX CO., OF MINNEAPOLIS, MINNESOTA, A CORPORATION OF MINNESOTA

HIGH-PRESSURE GREASE GUN

Application filed June 18, 1928. Serial No. 286,300.

My present invention relates to devices for delivering grease under high pressure and especially adapted for use in forcing grease to the various bearings of automobiles, but, of course, adapted also for more general use. Devices of this kind are quite generally known to the trade as grease guns and they are required to deliver the grease under very high pressure, to wit: five thousand pounds more or less, in order to cause the grease to force its way through grease-delivery conduits that are more or less clogged with hardened grease. The present invention accomplishes the above object and others, including a supply reservoir and means for automatically delivering the grease from the reservoir to the gun proper.

Generally stated, the invention consists of the novel devices and combinations of devices hereinafter described and defined in the claims.

In the accompanying drawings, which illustrate a commercial form of the improved device, like characters indicate like parts throughout the several views.

Referring to the drawings:

Fig. 1 is a side elevation of the improved device;

Fig. 2 is a rear end elevation of the same, parts being shown on a larger scale than in Fig. 1;

Fig. 3 is a longitudinal section taken on the line 3—3 of Fig. 2; and

Fig. 4 is a fragmentary section taken on the line 4—4 of Fig. 3.

The grease gun proper is of the differential cylinder and piston type and it includes an outer cylinder 5 and a cylinder 6 of relatively small diameter. This cylinder 6 is rigidly clamped to the front end head of the cylinder 5, as shown, by means of a shoulder 7 thereon, and a clamping nut 8 having threaded engagement therewith. The outer end of the cylinder 6 projects axially out of the cylinder 5 and is adapted to be connected by threaded engagement or otherwise to a tubular coupling 9 which, in turn, is adapted to be detachably secured to the receiving end of a flexible metallic grease-delivery tube, such, for example, as that disclosed in my pending application Serial No. 178,308, filed March 25, 1927, and entitled "Jointed grease pipe".

Located below but preferably parallel to the cylinder 5 is a cylindrical grease-containing supply reservoir 10, the upper front portion of which is welded or otherwise rigidly secured to a grease-delivery tube 11 which, in turn and as shown, is cast integral with the small high-compression cylinder 6. This tube 11 has communication with the reservoir 10 through a small port 12 and it delivers into the intermediate portion of said cylinder 6. The rear end of the cylinder 5 is closed by a head 13, and the rear end of the reservoir 10 is closed by a head 14, suitable gaskets 15 and 16, respectively, being preferably interposed between said heads and the edges of the members to which they are applied. The two heads 13 and 14 are preferably cast integral with each other and with a vertically disposed air delivery tube 17. At its upper end, the air tube 17 leads downward from a tubular head 18 cast integral therewith and provided at its outwardly extended end with a detachable hose coupling nipple 19 that is adapted to be connected by a hose, not shown, to a source of air supply under pressure.

The head 18 is provided with two valve seats 20 and 21, the former of which is connected to the air pressure side and the latter of which is connected to the atmosphere. Cooperating with the valve seats 20 and 21, respectively, are opposed valves 22 and 23 secured to opposite ends of a grooved valve stem 24. The grooves in the valve stem 24 are indicated by the numeral 25.

At its intermediate portion, the air tube 17 is connected to the rear end of the cylinder 5 by a port 26, and at its lower portion, said air tube is connected to the rear end of the cylindrical grease reservoir 10 through a port 27. In the air tube 17, above the port 27, is a valve seat 28 against which a small downwardly opening check valve 29 is normally pressed by a light coiled spring 30, which, as shown, reacts against an adjusting screw 31 tightly screwed into the lower end of said tube 17. The numeral 32 indicates a vent located in the air tube 17 below the check valve 29 and normally closed by a screw and ball vent valve 33. Located in the delivery portion of the cylinder 6 is a valve seat 34 that is normally engaged by an outwardly opening check valve 35 that is subject to a coiled spring 36. Just outward of the check valve 35, the delivery end of the cylinder 6 is provided with a vent 37 that is normally closed by a screw and ball valve 38. At its front end, the reservoir 10 is shown as provided with a filling neck 39 normally closed by a screw-threaded plug 40. The numeral 41 indicates a wire screen or retainer interposed in the inner end of the filler neck 39.

The numeral 42 indicates a yoke-like handle, shown as applied to the top of the cylinder 5. To this handle, an L-shaped lever 43 is pivoted at 44. The downwardly projecting short end of this lever is applied against or connected to the outer end of the valve stem 24.

Working within the cylinder 5 is a relatively large piston head made up, as shown, of a flat metal washer 45 and a leather cup 46, and provided with an axially projecting piston stem 47 that works as a high-compression piston within the high-compression cylinder 6. A quite strong coiled spring 48, located within the cylinder 5 surrounding the stem 47, is compressed between the piston washer 45 and the front end head of the cylinder 5, and exerts force tending to hold the relatively large piston in its retracted position shown in Fig. 3. Working within the cylindrical reservoir 10 is a follower-acting piston head 49.

The heads 13 and 14 may be secured to the cylinder 5 and reservoir 10, respectively, by any suitable means, but, as shown, this is accomplished by means of bolts 50 welded to the said members, passed through perforated lugs on said heads and provided with nuts 51.

*Operation*

When air pressure is supplied to the device through the nipple 19, and the lever 43 is depressed so as to cause the valve 22 to open the valve seat 20 and the valve 23 to close the valve seat 21, the air pressure will act upon the large piston head 45—46 of the grease gun and will force the same and the high-compression piston-acting stem 47 forward or toward the right in respect to Fig. 3, thereby compressing the spring 48 and forcing the grease past the check valve 35 and out through the coupling 9 to the grease-delivery hose or pipe, and from thence, of course, to the journal or device to be lubricated.

Inasmuch as the large piston of the grease gun has many times the area of the small piston or stem 47, it, of course, follows that a relatively very high pressure will be applied to the grease delivered from the cylinder 6. With the proportions illustrated in the drawings, tests have shown that, with an air pressure of one hundred and fifty pounds on the large piston of the grease gun, the grease in the small cylinder 6 will be subjected to a pressure of approximately seven thousand pounds. Of course, the initial outward movement of the piston-acting stem 47 will close the delivery end of the grease tube 11 and, thereafter, the grease confined in the outer portion of the cylinder 6 will be subjected to the high pressure above noted.

Simultaneously with the application of pressure to the large piston head of the grease gun as just above noted, the air will be admitted past the check valve 29 and into the rear end of the grease reservoir 10, and the air will then act upon the follower 49 and put the grease in the reservoir under quite high compression. The pressure per square inch applied to the follower 49 will not, however, be as great as that applied to the large piston head of the grease gun, for the reason that considerable pressure is required to open the check valve 29. By adjustments of the tension of the spring 30, the reduction between the pressures applied to the cylinder 5 and reservoir 10 may be varied to best suit the conditions encountered.

Each time that the lever 43 is to be pressed as above described, the differential piston of the grease gun will make one outward discharging movement against the tension of the spring 48, but as soon as the lever 43 is released, the valve 22 will close under air pressure and the valve 23 will open to the atmosphere. This will permit the air to escape from the rear end of the cylinder 5, so that almost instantly the spring 48 will force the differential piston back to its normal position shown in Fig. 3. The check valve 29, however, will confine air pressure in the rear end of the reservoir 10, so that the follower 49 and, hence, the grease in the reservoir, will be kept subject to pressure and this pressure will cause the grease to be forced from the reservoir through the tube 11 and into the projecting end of the high-compression cylinder 6, thereby always keeping that portion of the cylinder 6 that is between the check valve 35 and the front end of the piston stem 47 filled with grease ready to be discharged upon the next outward or operative movement of the differential piston of the grease gun. Air pressure introduced into the receiving end of the reservoir 10 will be caged therein by the check valve 29, and each time that a pressure impulse is imparted, additional air will be introduced into said reservoir so as to maintain the pressure on the piston 49 as the latter is moved forward.

The grease will be forced from the reservoir into the small cylinder 6 between the check valve and the piston-acting stem 47 under rearward or retracting movement of said stem and by the combined action of the pressure on the grease in the reservoir 10 and the partial vacuum or suction produced in said cylinder 6 by the backward movement of said stem. The pressure produced on the grease in the reservoir 10 should not be sufficient to cause the grease to press the check valve 35 open until the piston-acting stem 47 is moved forward and, of course, under the very high pressure produced by the said stem, the check valve 35 will freely open.

In case the parts through which the operator is trying to force oil become so tightly clogged that oil cannot be forced therethrough, the pressure in the delivery pipe will become exceedingly high and make removal of the delivery pipe from the receiving nipple very difficult. It is for the purpose of quickly relieving this excessive pressure that I provide the vent valve 38. The purpose of the valve 33 is to relieve the pressure in the air-receiving end of the reservoir 10 so that the follower 49 will freely move back to its position shown in Fig. 3 when the plug 40 is removed and a grease-supply tube is applied to the neck 39.

The device described, as is obvious, is a complete portable self-contained structure capable of being readily carried in one hand from place to place for the proper application of the grease to different journals or parts of the machine to be greased and it is important to note that the device may be carried and operated by one hand, due to the fact that the lever 43 is properly associated with the handle 42 for the accomplishment of that purpose. This leaves the other hand of the operator free for the manipulation of the free coupling-equipped end of the grease pipe, which latter is not shown in the drawings.

What I claim is :

1. A portable self-contained grease gun comprising relatively large and small cylinders, the latter having a discharge end, a relatively large piston working in said large cylinder and having a piston-acting ejecting stem working in said small cylinder, means for retracting said piston and its stem, a grease reservoir rigidly and definitely associated with said large and small cylinders, and having a discharge conduit connected to the outer portion of said small cylinder, an air conduit connected to the receiving ends of said cylinder and reservoir, a check valve interposed in said air conduit between said cylinder and the reservoir, and a double-acting valve in the receiving end of said air conduit normally opening the same to the atmosphere and closing the same from the air pressure supply but movable into a position to open said conduit to the air supply and to close the same to the atmosphere, in further combination with means for varying the pressure under which said check valve will be closed against the flow of air into said reservoir.

2. In a device of the character described, a barrel having a chamber for fluids, a power device comprising a piston and a plunger, means co-operating with the plunger to receive fluids from said chamber when the plunger is retracted and discharge them on a power stroke of the piston and plunger, and means for reciprocating the piston and plunger including means for simultaneously admitting air under pressure behind the piston and into said chamber.

3. In a device of the character described, a barrel having a chamber for fluids, a power device comprising a piston and a plunger, a spring to retract the piston and plunger, means co-operating with the plunger to receive fluids from said chamber when the plunger is retracted and discharge them on a power stroke of the piston and plunger, and means for simultaneously admitting air under pressure behind the piston and into said chamber.

4. In a device of the character described, a barrel having a chamber for fluids, a floating piston in said chamber adapted to press on said fluids, a power device comprising a power piston and a plunger, means co-operating with the plunger to receive fluids from said chamber when the plunger is retracted and discharge them on the power stroke of the power piston and plunger, and means for reciprocating the power piston and plunger including means for simultaneously admitting air under pressure behind both the power the piston and the floating piston in said chamber.

In testimony whereof I affix my signature.

VITUS A. BOKER.